United States Patent [19]

Verlaeten

[11] 3,944,474

[45] Mar. 16, 1976

[54] ELECTROLYTIC MANUFACTURE OF CHLORINE AND SODIUM CARBONATE

[75] Inventor: Jean Verlaeten, Brussels, Belgium

[73] Assignee: Solvay & Cie., Brussels, Belgium

[22] Filed: Sept. 11, 1974

[21] Appl. No.: 505,091

[30] Foreign Application Priority Data

Sept. 11, 1973 France .............................. 73.32710

[52] U.S. Cl. .............................. 204/87; 204/98;128
[51] Int. Cl.² ..... C25B 1/14; C25B 1/16; C25B 1/26
[58] Field of Search ......... 204/87, 128, 98; 423/421

[56] References Cited

UNITED STATES PATENTS

| | | | |
|---|---|---|---|
| 2,340,254 | 1/1944 | Stewart ................................. | 204/87 |
| 3,514,381 | 5/1970 | Seguela ................................. | 204/87 |
| 3,751,560 | 8/1973 | Neumann ............................. | 423/421 |
| 3,842,157 | 10/1974 | Neumann ............................. | 423/421 |
| 3,843,768 | 10/1974 | Neumann ............................. | 423/421 |

*Primary Examiner*—R. L. Andrews
*Attorney, Agent, or Firm*—Spencer & Kaye

[57] ABSTRACT

Manufacture of chlorine and sodium carbonate using a combination of electrolysis of an aqueous solution of sodium chloride in a diaphragm cell, carbonation of the caustic brine leaving the cell, and the ammonia-soda method of making sodium carbonate. An aqueous solution of sodium chloride is electrolyzed in at least one diaphragm cell to form a caustic brine. The caustic brine leaving the cell is carbonated and further treated. This is first done in a soda plant without ammonia by treating the caustic brine in at least one monocarbonation scrubber by reacting the caustic brine with a gas having a low carbon dioxide content without causing bicarbonate precipitation in the monocarbonation scrubber to form a monocarbonated caustic brine, and treating the monocarbonated caustic brine in at least one bicarbonation column by reacting at least part of it with gas rich in carbon dioxide to precipitate sodium bicarbonate in the bicarbonation column and to form a mother liquor. The precipitated sodium bicarbonate from the mother liquor is separated by filtration. The separated mother liquor is de-bicarbonated by converting the dissolved bicarbonate to carbonate. The de-bicarbonated mother liquor is saturated with respect to sodium chloride. Then the saturated liquor is treated in an ammonia-soda process for making sodium carbonate and the saturated liquor is used as at least a partial source of sodium chloride for such process.

20 Claims, 3 Drawing Figures

ELECTROLYTIC MANUFACTURE OF CHLORINE AND SODIUM CARBONATE

BACKGROUND OF THE INVENTION

The present invention relates to the manufacture of chlorine and sodium carbonate. More particularly, it relates to a method for the manufacture of chlorine and sodium carbonate by a combination of the electrolysis of an aqueous solution of sodium chloride in diaphragm cells with the carbonation of the caustic brine leaving the diaphragm cells and with the ammonia-soda method of making sodium carbonate.

It is known that in diaphragm cells for the electrolysis of aqueous solutions of sodium chloride, the proportion of the sodium chloride decomposed is less than 100% so that the caustic liquor obtained has a content of unconverted sodium chloride that is always more or less high, such a liquor being sometimes called "caustic brine". In current practice, because of the cost of electrical energy and in the interests of current efficiency, the conversion of sodium chloride during electrolysis in diaphragm cells is limited to about 50% of the sodium chloride starting material and the relatively dilute solutions obtained must be concentrated in multiple effect evaporators coupled with salt separators. The products obtained are chlorine, hydrogen, caustic liquors and salt, the last being reusable in concentrating the brine sent to electrolysis (cf. R. N. Shreve, The Chemical Process Industries, 2nd Edition, 1956, page 300).

The ammonia-soda method of making sodium carbonate (cf. R. N. Shreve, page 289 to 295 of the above reference) may be summarized as follows.

1. Formation of brine purified with respect to calcium and magnesium ions, usually by the action of sodium carbonate and lime or sodium carbonate and caustic soda on raw brine.
2. Use of purified brine for washing the exit gas from the bicarbonation columns.
3. Ammoniation, in apparatus known as an "absorber", of the brine leaving the gas washer by absorption of the ammonia and the carbon dioxide liberated in a later phase called "distillation".
4. Treatment of the ammoniacal brine thus produced in bicarbonation columns working in series with a bicarbonation column involved in the preceding operations, the latter column being known as a "washing column". The bicarbonation columns, furnished with trays or passettes and refrigerated at their lower part, are fed with carbon dioxide of 90 – 95% strength obtained by the calcination of sodium bicarbonate and with gas from lime kilns while the washing column is fed with gas of low $CO_2$ content. Crude sodium bicarbonate precipitates on formation in the bicarbonation columns.
5. Filtration of suspension leaving the bicarbonation columns in order to separate the crude sodium bicarbonate, which is washed with water on the filter in order to free it from sodium chloride and ammonium chloride. The mother liquor from the filtration consists of an aqueous solution containing principally sodium chloride and ammonium chloride.
6. Treatment of this mother liquor, in a stage known as distillation, to recover carbon dioxide and ammonia which is returned to the absorber for ammoniation of the brine. The step known as distillation consists in the main in heating the mother liquor from the filtration in order to separate the carbon dioxide, adding lime and treating the liquid obtained in a distillation column at the base of which steam is injected. The lime reacts with the ammonium chloride to form ammonia and calcium chloride, and the steam entrains the liberated ammonia.
7. Optionally, the liquor having the distillation — which consists essentially of an aqueous solution of calcium chloride and sodium chloride — may be submitted to evaporation in stages to recover the two chlorides separately.
8. The crude sodium bicarbonate obtained from the filter is generally calcined in a rotating drum drier ("secheur") in order to form anhydrous sodium carbonate (light ash) and a gas rich in carbon dioxide, which is cooled, purified, compressed and passed to the bottom of the bicarbonation columns.
9. If a sodium carbonate of specifically greater density (heavy ash) is required for certain uses, the light ash is mixed with sufficient water to form sodium carbonate monohydrate and this is then dried in a rotating kiln. According to a previously proposed process (French Patent 1,350,230), sodium carbonate monohydrate suitable for conversion to heavy ash may also be made by direct reaction of the crude bicarbonate removed from the filter of the soda plant with caustic liquor and anhydrous sodium bicarbonate, in this way the calcination of crude bicarbonate to light ash and rehydration of the light ash are dispensed with.

In an ammonia-soda plant of the conventional type, such as described above, the proportion of the sodium chloride converted is generally of the order of 72 – 76%.

In French Patent 1,364,282 there is described a process for the manufacture of sodium carbonate and chlorine wherein caustic brine from diaphragm cells is pre-carbonated without precipitation by means of a gas of low carbon dioxide content so as to convert the caustic soda to sodium carbonate and is then passed to an ammonia-soda plant together with ammoniacal brine prepared in the conventional manner. This procedure allows the addition of supplementary amounts of ammonia with the object of bicarbonation, which results in a higher percentage conversion of sodium chloride to soda and a reduced consumption of steam and lime. As indicated in other patents (French Patents 1,514,501 and 2,006,968), the formation of precipitates in the absorber, the washing column and the upper part of the bicarbonation columns is avoided when using caustic brines from electrolytic cells by recycling part of the liquid from the filtration stage to the absorber, optionally, after reducing its carbon dioxide content.

As the needs of the market have developed, it has been found that there is a tendency to produce an excess of caustic soda. There is therefore a need for processes that allow production of chlorine with co-production of sodium carbonate rather than co-production of caustic soda. Moreover, it is of importance to preserve as long as possible the existing ammonia-soda installations by altering them as necessary because of at least partial modification of the raw materials employed. Finally, according to another aspect of the problem, it is indispensable to increase the proportion of sodium chloride converted or to allow the recovery of unconverted chloride so as to reduce to a minimum the pollution of rivers.

SUMMARY AND GENERAL DESCRIPTION OF THE INVENTION

The main object of the present invention is to provide an effective solution of these problems.

Another object of the invention is to permit adjustment so that the respective amounts of chlorine and sodium carbonate produced by the process suit the needs of the market while avoiding the production of an excess of caustic soda.

A further object is to provide a process of the type described which rather significantly reduces the amount of waste salt passed to the disposal system, thereby minimizing pollution, by improving the aggregate conversion rate of sodium chloride and by providing the capability of producing purified salt.

Briefly, the present invention combines electrolysis in diaphragm cells with a soda plant without ammonia and with an ammonia-salt plant of conventional type. The invention provides a method for the manufacture of chlorine and sodium carbonate by combination of the electrolysis of an aqueous solution of sodium chloride in diaphragm cells, carbonation of the caustic brine leaving the cells, and the ammonia-soda method of making sodium carbonate. The carbonation of the caustic brine coming from the diaphragm cells is carried out in a soda plant without ammonia. Such plant includes at least one monocarbonation scrubber and at least one bicarbonation column which is refrigerated at its lowest part. The caustic brine is reacted with gas of low carbon dioxide content without causing bicarbonate precipitation in the monocarbonation scrubber(s). At least part of the liquor leaving the monocarbonation scrubber(s) is reacted with gas rich in carbon dioxide so as to precipitate sodium bicarbonate in the bicarbonation column(s). The precipitated sodium bicarbonate is separated from the mother liquor by a filtration means and is optionally converted to sodium carbonate by calcination. The mother liquor from the filtration means is de-bicarbonated by converting the dissolved bicarbonate to carbonate. The de-bicarbonated mother liquor is carried to saturation with respect to sodium chloride by evaporation or by the addition of solid salt. Then, the saturated liquor passes to an ammonia-soda plant as the sole source of sodium chloride feed or as a part-source of this raw material. In the latter case, the other part of the source, optionally, is purified brine of the type normally used in a conventional ammonia-soda plant or part of the liquor leaving the monocarbonation scrubbers(s) of the soda plant without ammonia or a mixture of these two materials.

The gas of low carbon dioxide content used for the monocarbonation of the caustic brine in the first stage of the soda plant without ammonia may advantageously be combustion gases or residual gases from the ammonia-soda plant, which may contain for example between 5 and 10% of carbon dioxide.

The apparatus used in the soda plant without ammonia therefore includes one or more monocarbonation scrubbers, in which a gas of low carbon dioxide content is employed under conditions such that no precipitate is produced. Downstream of these scrubbers there are one or more bicarbonation columns of the type used in conventional ammonia-soda plants. The monocarbonated caustic brine runs down the columns countercurrent to a stream of gas rich in carbon dioxide. The refrigeration of the base of the columns, for example, by means of banks of refrigerant tubes, completes the precipitation of the sodium bicarbonate. Ammonia can be added to the carbonated caustic brine to improve the degree of conversion of $Na_2CO_3$ to $NaHCO_3$.

The use of carbonated caustic brine and mother liquors from the soda plant without ammonia in the conventional ammonia-soda plant leads to very high concentrations of alkaline sodium (i.e., sodium present in the form of an alkaline compound) and carbonate in the liquors leaving the absorber, and these concentrations can cause precipitations in the absorber, the washing column and the upper part of the bicarbonation columns. As taught in the above-mentioned patents this disadvantage can be avoided by recycling part of the liquor from the filtration stage of the ammonia-soda plant to the absorber, optionally after reducing the carbon dioxide content of the liquor, for example by heating. Nevertheless, in the method of the present invention, the preliminary passage of the caustic brine through the soda plant without ammonia ensures the separation of a significant amount of alkaline sodium before the liquor enters the ammonia-soda plant and considerably reduces the risk of precipitation. The amount of filter liquor that needs to be recycled is thus reduced.

If it is desired to increase the ratio of chlorine to sodium carbonate produced, the method of the invention as mentioned above may be modified by progressively decreasing the feed of purified brine to the ammonia-soda plant. The ratio can be increased in this manner up to production of 0.35 to 0.4 top of chlorine per ton of sodium carbonate.

A further stage includes evaporating at least part of the caustic brine coming from the diaphragm cells in order to crystallize sodium chloride and form a brine that is more concentrated in caustic soda, which is then treated in the soda plant without ammonia, in the manner described above, after being mixed with any remainder of the caustic brine from the electrolytic cell. It should be understood that in this case no purified brine is fed to the ammonia-soda plant. In order to precipitate refined salt, practically pure, care should be taken not to push the evaporation too far, so as to avoid precipitating sodium sulphate or other impurities at the same time; the selection of the degree of concentration of the caustic brine to be carried out depends on the nature and the quantity of the impurities (sodium sulphate, for example) present in the caustic brine.

By way of example, in the case where the caustic brine contains 0.45% by weight of $Na_2SO_4$, the optimum concentration rises to about 22% NaOH. If the whole of the caustic brine is concentrated, there will result a total production of 0.51 ton of chlorine per ton of sodium carbonate.

When the whole or a large portion of the caustic brine is submitted to evaporation, it is necessary to dilute the mother liquor and any balance of the caustic brine from the electrolysis cell before passing them into the monocarbonation stage of the soda plant without ammonia, so as to avoid precipitation in the scrubbers. In order to achieve this, a part of the mother liquor coming from the separation of sodium bicarbonate in the soda plant without ammonia, optionally after debicarbonation, is not passed to the ammonia-soda plant but is recycled between the evaporators used for crystallization of sodium chloride and the scrubber(s) used for monocarbonation of the caustic brine in the soda plant without ammonia.

The de-bicarbonation of the mother liquor from the soda plant without ammonia may be carried out in any known manner. For example, within the method of the present invention, it may be carried out by the addition of sufficient caustic brine from an electrolysis cell. Nevertheless it is more advantageous to achieve it by heating and liberation of carbon dioxide; in this way highly concentrated carbon dioxide gas is recovered, which can be recycled to the bicarbonation columns.

An additional advantage of the method according to the invention resides in the fact that it allows the production of heavy soda ash without passing through the stage of making sodium bicarbonate. In order to achieve this an evaporator installation is inserted in the soda plant without ammonia between the monocarbonation scrubber(s) and the bicarbonation column(s). The appropriate conditions in this installation are chosen to obtain crystallization of part of the alkaline sodium present in the form of sodium carbonate monohydrate, which may then be converted in heavy ash by the usual process, while the mother liquors are passed to the bicarbonation stage of the soda plant without ammonia. This procedure is particularly applicable when the entire or a large part of the caustic brine is passed through the salt evaporators.

The mother liquor from filtration or hydro-extraction of sodium bicarbonate in the soda plant without ammonia should be taken, after de-bicarbonation, to saturation with respect to sodium chloride. As circumstances may dictate, this saturated state may be achieved by addition of solid salt or by evaporation. In the latter case the necessary steam for concentrations may be obtained by flash-off from the mother liquors of the ammonia-soda plant. In an installation where the unconverted salt is separated after the distillation stage in the ammonia-soda plant, the addition of this solid salt will in general be preferred. The mother liquor can also be fed into boreholes for resaturation with sodium chloride, in the case where boreholes are available close to the factory.

If the demand for chlorine greatly exceeds the demand for caustic soda, the process can be further modified by passing to the ammonia-soda plant only part of the mother liquors that have been de-bicarbonated and carried to saturation with respect to sodium chloride, which come from the soda plant without ammonia, the other part being exhausted of alkaline sodium by passing it through one or more supplementary bicarbonation columns without ammonia, then being rejected.

DETAILED DESCRIPTION OF THE PREFERRED EMBODIMENTS

Figure 1:
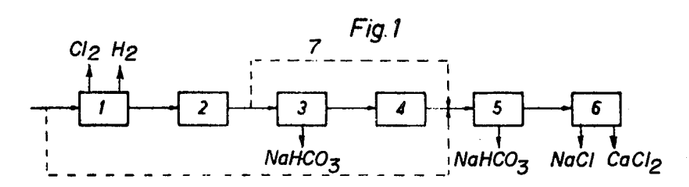
FIG. 1 is a diagrammatic view of production in a simplified embodiment.

FIG. 1 illustrates the simplest embodiment of the invention. A purified sodium chloride brine is fed at least partly into an installation of electrolytic diaphragm cells 1, and, optionally, partly into an ammonia-soda plant 5, by way of line 8.

Chlorine and hydrogen are evolved in the cells 1, leaving a caustic brine (solution of NaCl and NaOH), which is passed into at least one scrubber 2 fed with gas of low $CO_2$ content so as to convert the caustic brine to sodium carbonate without precipitation. At least part of the solution of NaCl and $Na_2CO_3$ thus produced is passed into a soda plant without ammonia 3. Plant 3 includes one or more bicarbonation columns fed with gas rich in carbon dioxide and refrigerated at their lower parts, where crude sodium bicarbonate is precipitated. This may be separated by filtration or hydro-extraction and converted in known manner to sodium carbonate of the desired packing density (light ash or heavy ash). Any part of the carbonated brine leaving the monocarbonation scrubbers 2 which has not been treated in the bicarbonation columns may be fed into the ammonia-soda plant 5 by way of line 7. The mother liquor from the filtration or hydro-extraction of the sodium bicarbonate produced in 3 is de-bicarbonated and carried to saturation with respect to NaCl, either by the addition of solid salt or by evaporation in 4. Then it is passed into the ammonia-soda plant 5, where it serves as the sole source or a part-source of the sodium chloride feed. Optionally, in 6, the liquor leaving the distillation stage of the ammonia-soda plant is submitted to stepwise evaporation in order to recover separately the sodium chloride and/or the calcium chloride, in other cases, solid chlorides are not produced and the liquor is voided, either into worked-out boreholes or into the sea or a river. The crude sodium bicarbonate separated at a filtration stage may be converted to sodium carbonate of desired packing density by known methods, like that produced in the soda plant without ammonia. The residual gases from the bicarbonation columns of both the soda plant without ammonia and the ammonia-soda plant may be used for monocarbonation of the caustic brine in the scrubber(s) 2.

Figure 2:
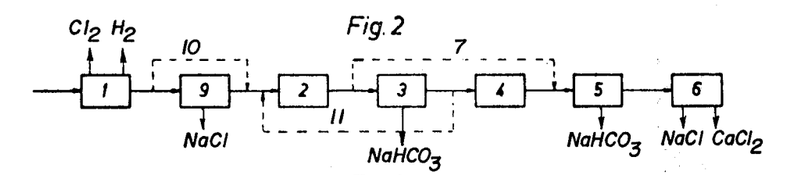
FIG. 2 is a diagrammatic view of production similar to FIG. 1 but including a salt recovery plant after the diaphragm cells.

FIG. 2 represents the method of the invention modified by incorporation of a salt recovery plant at the outlet of the electrolytic cells. By operating with salt recovery, the amount of sodium chloride treated in the ammonia-soda plant is reduced and thereby the ratio of chlorine production to sodium carbonate production, considered over the entire installation, is increased. The arrangement of FIG. 2 is the same as that of FIG. 1 except that the feed of purified brine 8 into the ammonia-soda plant has been dispensed with and evaporators 9 have been inserted between the electrolytic cells 1 and the monocarbonation scrubber(s) 2. The dashed line 10 represents the part of the caustic brine which is optionally not treated in the evaporators 9 and which is passed directly to the monocarbonation stage. The dashed line 11 indicates recycling of mother liquor, optionally de-bicarbonated after leaving the soda plant without ammonia, returned to the inlet of the monocarbonation scrubbers so as to avoid precipitation in these scrubbers if the entire or a large proportion of the caustic brine is treated in the salt recovery plant 9.

Figure 3:
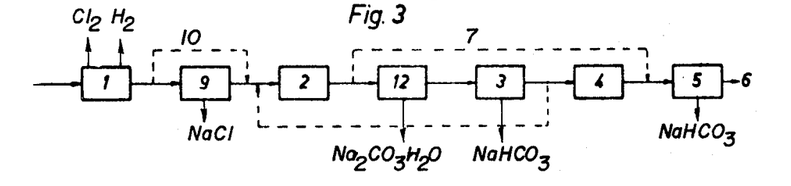
FIG. 3 is a diagrammatic view of production similar to FIG. 2 including a plant for the production of crystals of sodium carbonate monohydrate after the scrubbers.

FIG. 3 represents the method of the invention when a plant for the production of crystals of sodium carbonate monohydrate 12 is interposed between the monocarbonation scrubbers 2 and the bicarbonation columns 3 of the soda plant without ammonia. It should be noted that plant 12 for the production of sodium carbonate monohydrate may also be inserted in the arrangement of FIG. 1.

A further variant within the scope of the invention has an arrangement according to FIG. 3, except that only part of the mother liquor coming from 4 after de-bicarbonation and resaturation with sodium chloride is passed to the ammonia-soda plant 5, the other part being treated in one or more bicarbonation columns without ammonia of the type used at 3. This variant is also useful if the stage of precipitating sodium carbonate monohydrate is omitted.

The following numerical examples further illustrate the details of putting the invention into practice and the advantages flowing therefrom. They show the stages employed to increase the ratio of chlorine to sodium carbonate produced, while underlining the advantages resulting from reduction in the amount of waste chlorine and reduction in the consumption of steam and lime in the ammonia-soda plant per ton of total sodium carbonate produced.

EXAMPLE 1

An ammonia-soda plant was fed with a mixture of caustic brine from diaphragm cells, previously monocarbonated, and purified brine. The proportions of the two liquids fed in were 1,000 kg of caustic brine to 1,182.7 kg of purified brine, these proportions being such that they correspond to a ratio of chlorine production in the diaphragm cells to sodium carbonate production in the ammonia-soda plant equal to 0.2 ton $Cl_2$/ton $Na_2CO_3$. This operation is carried out according to a variation of the process described in French Patent 1,364,282 (cf. U.S. Pat. 3,368,866), including a precarbonation of the caustic brine prior to its introduction in the ammonia-soda plant and the feeding of the resulting precarbonated brine to the absorber together with the purified brine instead of feeding it directly to the bicarbonation columns.

The following table gives the consumption and production of the various compounds, in kg, during the principal operations of the process, referred to 1000 kg of caustic brine fed to the system.

| Operation | | Result of Operation | |
|---|---|---|---|
| 1. Monocarbonation | | | |
| Caustic brine | | Carbonated brine | |
| NaOH | 90 | $Na_2CO_3$ | 119.3 |
| NaCl | 160 | NaCl | 160 |
| $H_2O$ | 750 | $H_2O$ | 752.1 |
| Carbonation gas | | | |
| $CO_2$ | 49.6 | | |
| 2. Absorption of $NH_3$ | | | |
| Carbonated brine | | Ammoniacal brine | |
| $Na_2CO_3$ | 119.3 | NaCl | 655.6 |
| NaCl | 160 | $NH_3$ | 190.5 |
| $H_2O$ | 752.1 | $CO_2$ | 168.3 |
| | | $H_2O$ | 2431.7 |
| Purified brine | | | |
| NaCl | 229.8 | | |
| $H_2O$ | 882.9 | | |
| Recycle liquor from filters | | | |
| NaCl | 64.1 | | |
| $NH_3$ | 18.6 | | |
| $NH_4Cl$ | 120.4 | | |
| $CO_2$ | 36.1 | | |
| $H_2O$ | 721.9 | | |
| Gas from distillation | | | |
| $CO_2$ | 82.7 | | |
| $NH_3$ | 133.6 | | |
| $H_2O$ | 54.5 | | |
| 3. Carbonation and filtration of $NaHCO_3$ | | | |
| Ammoniacal brine | | Hydro-extracted bicarbonate | |
| NaCl | 655.6 | $NaHCO_3$ | 634.1 |
| $NH_3$ | 190.5 | $H_2O$ | 111.9 |
| $CO_2$ | 168.3 | Liquor from filters | |
| $H_2O$ | 2431.7 | NaCl | 214.0 |
| Carbonation gas | | $NH_3$ | 62.2 |
| $CO_2$ | 284.9 | $NH_4Cl$ | 403.9 |

| Operation | | Result of Operation | |
|---|---|---|---|
| Washing water from filters | | $CO_2$ | 121.1 |
| $H_2O$ | 199.4 | $H_2O$ | 2383.3 |
| 4. Distillation | | | |
| Liquor from filters | | Gas passed to absorption stage | |
| NaCl | 149.9 | $CO_2$ | 82.7 |
| $NH_3$ | 43.6 | $NH_3$ | 133.6 |
| $NH_4Cl$ | 283.5 | $H_2O$ | 54.5 |
| $CO_2$ | 84.9 | | |
| $H_2O$ | 1661.4 | Residual liquor | |
| Milk of lime | | NaCl | 149.9 |
| CaO | 154 | $CaCl_2$ | 294.1 |
| $H_2O$ | 718 | $CaCO_3$ | 5 |
| Steam | | CaO | 2.8 |
| $H_2O$ | 544 | $H_2O$ | 2916.6 |

It is found that the corresponding production of chlorine is equal to $$90 \times \frac{35.5}{40} = 80 \text{ kg}$$

and the production of sodium carbonate is equal to $$634.1 \times \frac{106}{2 \times \nu} = 400 \text{ kg},$$

giving a ratio of these products equal to 80/400 = 0.2 kg $Cl_2$/kg $Na_2CO_3$.

It is found that the consumption of steam and of lime in the distillation stage per ton of sodium carbonate produced amounts to:

$$\frac{544}{400} \times 1000 = 1360 \text{ kg steam}$$

and $$\frac{154}{400} \times 1000 = 385 \text{ kg CaO}.$$

The quantity of chlorides present in the residual liquor from the soda plant, per ton of carbonate produced, amounts to:

$$\frac{1000}{400}\left(149.9 \times \frac{35.5}{58.5} + 294.1 \times \frac{2 \times 35.5}{111}\right) = 698 \text{ kg Cl}^-.$$

Finally, it was necessary to recycle 961.1 kg of liquor from the filters to the inlet of the ammonia absorber, this being 30% by weight of the total liquor from the filters.

EXAMPLE 2

The caustic brine coming from electrolytic diaphragm cells was treated according to the procedure illustrated in FIG. 1, in successive stages as follows:
1. Monocarbonation in scrubbers by gas of low $CO_2$ content without precipitation
2. Bicarbonation in bicarbonation columns fed with gas rich in $CO_2$ and separation of the bicarbonate crystals
3. De-bicarbonation of the mother liquors by indirect heating 4. Concentration of the mother liquors by evaporation up to saturation with NaCl
5. Passage of the resaturated mother liquors into an ammonia-soda plant together with a proportion of purified brine.

The following table gives the consumption and production of the various compounds in the course of the principal operations of the process, in kilograms, referred to 1000 kg of caustic brine fed into the system.

| Operation | Result of Operation |
|---|---|
| 1. Monocarbonation | |
| Caustic brine | Carbonated brine |
| NaOH 90 | $Na_2CO_3$ 119.3 |
| NaCl 160 | NaCl 160 |
| $H_2O$ 750 | $H_2O$ 752.1 |
| Carbonation gas | |
| $CO_2$ 49.6 | |
| 2. Bicarbonation and separation of crystals | |
| Carbonated brine | Hydro-extracted crystals of sodium bicarbonate |
| $Na_2CO_3$ 119.3 | $NaHCO_3$ 161.9 |
| NaCl 160 | $H_2O$ 24 |
| $H_2O$ 752.1 | Mother liquors from bicarbonation and hydro-extraction |
| Carbonation gas | $NaHCO_3$ 27.3 |
| $CO_2$ 49.6 | NaCl 160 |
| Washing water | $H_2O$ 755.8 |
| $H_2O$ 48 | |
| 3. De-bicarbonation by indirect heating | |
| Mother liquors from bicarbonation | De-bicarbonated mother liquors |
| $NaHCO_3$ 27.3 | $Na_2CO_3$ 17.2 |
| NaCl 160 | NaCl 160 |
| $H_2O$ 755.8 | $H_2O$ 758.7 |
| | $CO_2$ 7.2 |
| 4. Reconcentration | (liberated) |
| De-bicarbonated mother liquors | Resaturated mother liquors |
| $Na_2Co_3$ 17.2 | $Na_2CO_3$ 17.2 |
| NaCl 160 | NaCl 160 |
| $H_2O$ 758.7 | $H_2O$ 471.5 |
| | Evaporated water |
| | $H_2O$ 287.2 |
| 5. Absorption of $NH_3$ | |
| Resaturated mother liquors | Ammoniacal brine |
| $Na_2CO_3$ 17.2 | NaCl 499.4 |
| NaCl 160 | $NH_3$ 130.5 |
| $H_2O$ 471.5 | $CO_2$ 73.8 |
| Purified brine | $H_2O$ 1377.1 |
| NaCl 263.4 | |
| $H_2O$ 775.5 | |
| Recycle liquor from filters | |
| NaCl 7.0 | |
| $NH_3$ 2.0 | |
| $NH_4Cl$ 17.4 | |
| $CO_2$ 4.0 | |
| $H_2O$ 79 | |
| Gas from distillation | |
| $CO_2$ 62.7 | |
| $NH_3$ 123 | |
| $H_2O$ 48.2 | |
| 6. Carbonation and filtration of $NaHCO_3$ | |
| Ammoniacal brine | Hydro-extracted bicarbonate |
| NaCl 449.4 | $NaHCO_3$ 472.1 |
| $NH_3$ 130.5 | $H_2O$ 83.3 |
| $CO_2$ 73.8 | Liquor from filters |
| $H_2O$ 1377.1 | $NH_4Cl$ 300.7 |
| Carbonation gas | NaCl 120.6 |
| $CO_2$ 241.8 | $CO_2$ 68.3 |
| Washing water from filters | $NH_3$ 35.0 |
| $H_2O$ 148.5 | $H_2O$ 1341.1 |
| 7. Distillation | |
| Liquid from filters | Gas passed to absorption stage |
| $NH_4Cl$ 283.3 | $NH_3$ 123 |
| NaCl 113.6 | $CO_2$ 62.7 |
| $CO_2$ 64.3 | $H_2O$ 48.2 |
| $NH_3$ 33 | |
| $H_2O$ 1262.1 | Residual liquor |
| Milk of lime | NaCl 113.6 |
| CaO 152.7 | $CaCl_2$ 293.9 |
| $H_2O$ 711.6 | CaO 2.2 |
| Steam | $CaCO_3$ 3.9 |
| $H_2O$ 457 | $H_2O$ 2430.2 |

The relative amounts of the two brines fed to the process were 1000 kg of caustic brine from the diaphragm cells to 1038.9 kg of purified brine. As in the case of Example 1, this ratio corresponds to the production of 80 kg of electrolytic chlorine per 400 kg total of sodium carbonate (of which $$161.9 \times \frac{106}{2 \times 84} = 102 \text{ kg}$$

are produced in the soda plant without ammonia and $$472.1 \times \frac{106}{2 \times 84} = 298 \text{ kg}$$

are produced in the ammonia-soda plant), giving in all a ratio of 0.2 ton of chlorine per ton of total sodium carbonate produced.

It is found that the consumption of steam and of lime in the distillation stage, per ton of total sodium carbonate produced, amounts to:

$$\frac{457}{400} \times 1000 = 1143 \text{ kg steam}$$

and $$\frac{152.7}{400} \times 1000 = 382 \text{ kg CaO}.$$

The amount of steam used in concentrating the mother liquors of the soda plant without ammonia is 312 kg of steam per ton of total carbonate. This steam is provided by flash-off from the residual liquor of the ammonia-soda plant, which provides 345 kg of steam per ton of total carbonate produced.

The quantity of chlorides present in the residual liquor from the soda plant, per ton of carbonate produced, amounts to:

$$\frac{1000}{400}\left(113.6 \times \frac{35.5}{58.5} + 293.9 \times \frac{2 \times 35.5}{111}\right) = 642 \text{ kg Cl}^-$$

Finally, it was necessary to recycle 109.4 kg of liquor from the filters to the ammonia absorber, this being 5.8% by weight of the total liquor from the filters.

To summarize, the following table shows the advantages of treating the caustic brine in the manner of the invention (Example 2), the figures given being the amounts per ton of total carbonate produced.

| | | Example 2 | Example 1 |
|---|---|---|---|
| Steam used in distillation | kg | 1143 | 1360 |
| Lime used in distillation | kg | 382 | 385 |
| Chlorides passed to waste | kg Cl⁻ | 642 | 698 |
| Steam used on concentrating mother liquor | kg | 312* | — |
| Fraction of liquor from filters recycled to ammonia absorber | % | 5.8 | 30 |

*Steam obtained by flash-off of the residual distillation liquor.

EXAMPLE 3

This example shows the possibility of increasing the ratio of chlorine produced by electrolysis in diaphragm cells to sodium carbonate obtained from the caustic brine, by concentrating by evaporation a part of the caustic brine with recovery of refined salt free from sodium sulphate before introducing the brine into the soda plant without ammonia. The following table gives, in kg, the consumption and production of the various compounds in the course of the principal stages of the process, in the case where 600 kg of caustic brine are treated by pre-evaporation while 400 kg of caustic brine are passed directly to the soda plant without ammonia. This ratio provides the maximum separation of refined salt compatible with operation of the monocarbonation scrubbers without causing precipitation.

| Operation | | Result of Operation | |
|---|---|---|---|
| 1. Evaporation, crystallization and hydro-extraction of NaCl | | | |
| Caustic brine | | Mother liquors | |
| NaOH | 54 | NaOH | 54 |
| NaCl | 93.7 | NaCl | 29.8 |
| $Na_2SO_4$ | 2.7 | $Na_2SO_4$ | 2.7 |
| $H_2O$ | 449.6 | $H_2O$ | 182.3 |
| Washing NaCl on hydro-extractor | | Refined salt | |
| | | NaCl | 63.9 |
| $H_2O$ | 23.7 | $H_2O$ | 2.6 |
| 2. Monocarbonation | | | |
| Mother liquors from crystallization of NaCl | | Carbonated brine | |
| NaOH | 54 | $Na_2CO_3$ | 119.3 |
| NaCl | 29.8 | NaCl | 92.3 |
| $Na_2SO_4$ | 2.7 | $Na_2SO_4$ | 4.5 |
| $H_2O$ | 182.3 | $H_2O$ | 484.2 |
| Caustic brine | | | |
| NaOH | 36 | | |
| NaCl | 62.5 | | |
| $Na_2SO_4$ | 1.8 | | |
| $H_2O$ | 299.7 | | |
| Carbonation gas | | | |
| $CO_2$ | 49.6 | | |
| 3. Bicarbonation and separation of crystals | | | |
| Carbonated brine | | Hydro-extracted crystals of sodium bicarbonate | |
| $Na_2CO_3$ | 119.3 | $NaHCO_3$ | 169.5 |
| NaCl | 92.3 | $H_2O$ | 25.3 |
| $Na_2SO_4$ | 4.5 | | |
| | | Mother liquors from bicarbonation and hydro-extraction | |
| $H_2O$ | 484.2 | $NaHCO_3$ | 19.6 |
| Carbonation gas | | NaCl | 92.3 |
| $CO_2$ | 49.6 | $Na_2SO_4$ | 4.5 |
| Washing water | | $H_2O$ | 487.0 |
| $H_2O$ | 48.4 | | |
| 4. De-bicarbonation by indirect heating | | | |
| Mother liquors from bicarbonation | | De-bicarbonated mother liquors | |
| $NaHCO_3$ | 19.6 | $Na_2CO_3$ | 12.4 |
| NaCl | 92.3 | NaCl | 92.3 |
| $Na_2SO_4$ | 4.5 | $Na_2SO_4$ | 4.5 |
| $H_2O$ | 487.0 | $H_2O$ | 484.9 |
| 5. Reconcentration | | | |
| De-bicarbonated mother liquors | | Resaturated mother liquors | |
| $Na_2CO_3$ | 12.4 | $Na_2CO_3$ | 12.4 |
| NaCl | 92.3 | NaCl | 92.3 |
| $Na_2SO_4$ | 4.5 | $Na_2SO_4$ | 4.5 |
| $H_2O$ | 484.9 | $H_2O$ | 272.0 |

The resaturated mother liquors are then passed to the ammonia-soda plant, for which they constitute the sole feed; the production of $Na_2CO_3$ in this plant is 76.2 kg.

The total production of sodium carbonate is therefore:

$$169.5 \times \frac{106}{168} + 76.9 = 183.8 \text{ kg,}$$

for electrolytic chlorine production of 80 kg, giving a ratio of chlorine to sodium carbonate production of 0.43 ton $Cl_2$/ton $Na_2CO_3$.

The consumption of steam and of lime in the ammonia-soda plant are respectively 1329 kg steam and 459 kg CaO per ton of sodium carbonate produced in the ammonia-soda plant.

The recycle of liquor from the filters to the ammonia absorber amounts to 16% by weight of the total liquor from the filters.

The quantity of chlorides present 758.8 the residual liquor from the soda plant is 758,8 kg Cl⁻ per ton of sodium carbonate produced in the ammonia-soda plant, which is equivalent to 317.5 kg Cl⁻ per ton of total sodium carbonate produced in the process.

EXAMPLE 4

This example shows the possibility of treating the whole of the caustic brine from the diaphragm cells by concentrating it before feeding it into the soda plant without ammonia, by providing a recycle of mother liquor from the bicarbonate crystallization stage of the soda plant without ammonia to the inlet of the monocarbonation scrubbers.

The following table gives the consumption and production of the various compounds in the course of the principal stages of the process, in kg per 1000 kg of caustic brine from the diaphragm cells fed into the system.

| Operation | | Result of Operation | | |
|---|---|---|---|---|
| 1. Evaporation, crystallization and hydro-extraction of NaCl | | | | |
| Caustic brine | | Mother liquors | | |
| NaOH | 90 | NaOH | 90 | |
| NaCl | 156.2 | NaCl | 49.7 | |
| $Na_2SO_4$ | 4.5 | $Na_2SO_4$ | 4.5 | |
| $H_2O$ | 749.3 | $H_2O$ | 303.8 | |
| Washing NaCl on hydro-extractor | | Refined salt | | |
| | | NaCl | 106.5 | |
| $H_2O$ | 39.5 | $H_2O$ | 4.3 | |
| 2. Monocarbonation | | | | |
| Mother liquors from crystallization of NaCl | | Carbonated brine | | |
| NaOH | 90 | $Na_2CO_3$ | 124.1 | |
| NaCl | 49.7 | | NaCl | 77.1 |
| $Na_2SO_4$ | 4.5 | $Na_2SO_4$ | 7 | |
| $H_2O$ | 303.8 | $H_2O$ | 478.5 | |
| Recycle of mother liquors from bicarbonation | | | | |
| $NaHCO_3$ | 7.8 | | | |
| NaCl | 27.4 | | | |
| $Na_2SO_4$ | 2.5 | | | |
| $H_2O$ | 173.0 | | | |
| Carbonation gas | | | | |

-continued

| Carbonated brine | | Hydro-extracted crystals of NaHCO$_3$ | |
|---|---|---|---|
| | | CO$_2$ | 47.5 |

3. Bicarbonation and separation of crystals

| Carbonated brine | | Hydro-extracted crystals of NaHCO$_3$ | |
|---|---|---|---|
| Na$_2$CO$_3$ | 124.1 | NaHCO$_3$ | 174.5 |
| NaCl | 77.1 | H$_2$O | 26.1 |
| Na$_2$SO$_4$ | 7 | Mother liquors from bicarbonation and hydro-extraction | |
| H$_2$O | 478.5 | | |
| Carbonation gas | | NaHCO$_3$ | 22.2 |
| CO$_2$ | 51.5 | NaCl | 77.1 |
| Washing Water | | Na$_2$SO$_4$ | 7 |
| H$_2$O | 51.7 | H$_2$O | 483.0 |

4. De-bicarbonation by indirect heating

| Mother liquors from bicarbonation | | De-bicarbonated mother liquors | |
|---|---|---|---|
| NaHCO$_3$ | 14.4 | Na$_2$CO$_3$ | 9.1 |
| NaCl | 49.7 | NaCl | 49.7 |
| Na$_2$SO$_4$ | 4.5 | Na$_2$SO$_4$ | 4.5 |
| H$_2$O | 310 | H$_2$O | 311.5 |

5. Reconcentration

| De-bicarbonated mother liquors | | Resaturated mother liquors | |
|---|---|---|---|
| Na$_2$CO$_3$ | 9.1 | Na$_2$CO$_3$ | 9.1 |
| NaCl | 49.7 | NaCl | 49.7 |
| Na$_2$SO$_4$ | 4.5 | Na$_2$SO$_4$ | 4.5 |
| H$_2$O | 311.5 | H$_2$O | 146.4 |

The resaturated mother liquors are then passed to the ammonia-soda plant, for which they constitute the sole feed; the production of Na$_2$CO$_3$ in this plant is 45.6 kg.

The total production of sodium carbonate is therefore:

$$174.5 \times \frac{106}{168} + 45.6 = 155.5 \text{ kg},$$

for electrolytic chlorine production of 80 kg, giving a ratio of chlorine to sodium carbonate production of 0.51 ton Cl$_2$/ton Na$_2$CO$_3$.

The consumption of steam and of lime in the ammonia-soda plant are respectively 1237 kg steam and 437 kg CaO per ton of sodium carbonate produced in the ammonia-soda plant.

The recycle of liquor from the filters to the ammonia absorber amounts to 20% by weight of the total liquor from the filters.

The quantity of chlorides present in the residual liquor from the soda plant is 716 kg Cl$^-$ per ton of sodium carbonate produced in the ammonia-soda plant, which is equivalent to 210 kg Cl$^-$ per ton of total sodium carbonate produced in the process.

EXAMPLE 5

This example shows the possibility of separating a large portion of the alkaline sodium of the caustic brine from the diaphragm cells directly in the form of sodium carbonate monohydrate, in the case where a large part of this caustic brine is submitted to concentration before being fed into the soda plant without ammonia, for example when 600 kg of caustic brine are submitted to preconcentration for each 400 kg of caustic brine fed direct to the soda plant without ammonia.

The following table shows the consumption and production of the various compounds in the course of the principal stages of the process, expressed as kg per 1000 kg of caustic brine used.

| Operation | | Result of Operation | |
|---|---|---|---|

1. Evaporation, crystallization and hydro-extraction of NaCl

| Caustic brine | | Mother liquors | |
|---|---|---|---|
| NaOH | 54 | NaOH | 54 |
| NaCl | 93.7 | NaCl | 29.8 |
| Na$_2$SO$_4$ | 2.7 | Na$_2$SO$_4$ | 2.7 |
| H$_2$O | 449.6 | H$_2$O | 182.3 |
| Washing NaCl in hydro-extractor | | Refined salt | |
| | | NaCl | 63.9 |
| H$_2$O | 23.7 | H$_2$O | 2.6 |

2. Monocarbonation

| Mother liquors from crystallization of NaCl | | Carbonated brine | |
|---|---|---|---|
| NaOH | 54 | Na$_2$CO$_3$ | 119.3 |
| NaCl | 29.8 | NaCl | 92.3 |
| Na$_2$SO$_4$ | 2.7 | Na$_2$SO$_4$ | 4.5 |
| H$_2$O | 182.3 | H$_2$O | 484.2 |
| Caustic brine | | | |
| NaOH | 36 | | |
| NaCl | 62.5 | | |
| Na$_2$SO$_4$ | 1.8 | | |
| H$_2$O | 299.7 | | |
| Carbonation gas | | | |
| CO$_2$ | 49.6 | | |

3. Evaporation-crystallization of Na$_2$CO$_3$.H$_2$O

| Carbonated brine | | Hydro-extracted crystals | |
|---|---|---|---|
| Na$_2$CO$_3$ | 119.3 | Na$_2$CO$_3$ | 47.8 |
| NaCl | 92.3 | H$_2$O | 10.5 |
| Na$_2$SO$_4$ | 4.5 | Mother liquors | |
| H$_2$O | 484.2 | Na$_2$CO$_3$ | 71.5 |
| Washing of Na$_2$CO$_3$.H$_2$O | | NaCl | 92.3 |
| H$_2$O | 8.8 | Na$_2$SO$_4$ | 4.5 |
| | | H$_2$O | 366.3 |

4. Bicarbonation and separation of crystals

| Mother liquors from Na$_2$CO$_3$.H$_2$O crystallizers | | Hydro-extracted crystals of NaHCO$_3$ | |
|---|---|---|---|
| Na$_2$CO$_3$ | 71.5 | NaHCO$_3$ | 101.6 |
| NaCl | 92.3 | H$_2$O | 15.2 |
| Na$_2$SO$_4$ | 4.5 | Mother liquors from bicarbonation and hydro-extraction | |
| H$_2$O | 366.3 | | |
| Carbonation gas | | NaHCO$_3$ | 11.7 |
| CO$_2$ | 12.1 | NaCl | 92.3 |
| Washing water | | Na$_2$SO$_4$ | 4.5 |
| H$_2$O | 28.8 | H$_2$O | 375.5 |

5. De-bicarbonation by indirect heating

| Mother liquors from bicarbonation | | De-bicarbonated mother liquors | |
|---|---|---|---|
| NaHCO$_3$ | 11.7 | Na$_2$CO$_3$ | 7.4 |
| NaCl | 92.3 | NaCl | 92.3 |
| Na$_2$SO$_4$ | 4.5 | Na$_2$SO$_4$ | 4.5 |
| H$_2$O | 375.5 | H$_2$O | 376.8 |

6. Reconcentration

| De-bicarbonated mother liquors | | Resaturated mother liquors | |
|---|---|---|---|
| Na$_2$CO$_3$ | 7.4 | Na$_2$CO$_3$ | 7.4 |
| NaCl | 92.3 | NaCl | 92.3 |
| Na$_2$SO$_4$ | 4.5 | Na$_2$SO$_4$ | 4.5 |
| H$_2$O | 376.8 | H$_2$O | 265.0 |

The resaturated mother liquors are then passed to the ammonia-soda plant, for which they constitute the sole feed; the production of Na$_2$CO$_3$ in this plant is 72.6 kg.

The total production of sodium carbonate (as Na$_2$CO$_3$) is therefore:

$$47.8 + 101.6 \times \frac{106}{168} + 72.6 = 184.4 \text{ kg}$$

for electrolytic chlorine production of 80 kg, giving a ratio of chlorine to sodium carbonate production of 0.43 ton Cl$_2$/ton Na$_2$CO$_3$.

The consumption of steam and of lime in the ammonia-soda plant are respectively 1394 kg of steam and 491 kg of CaO per ton of sodium carbonate produced in the ammonia-soda plant.

The recycle of liquor from the filters to the ammonia absorber amounts to 10% by weight of the total liquor from the filters.

The quantity of chlorides present in the residual liquor from the soda plant is 805 kg Cl$^-$per ton of sodium carbonate produced in the soda plant without ammonia, i.e. 317 kg Cl⁻ per ton of sodium carbonate produced in the process.

Moreover, the heavy ash produced direct from the caustic brine amounts to:

$$100 \times \frac{47.8}{119.3} = 40\%$$

of the alkaline sodium contained in the caustic brine employed.

It will be understood that the above description of the present invention is susceptible to various modifications, changes and adaptations, and the same are intended to be comprehended within the meaning and range of equivalents of the appended claims.

I claim:

1. A method for making chlorine and sodium carbonate comprising, in combination:
   1. electrolyzing an aqueous solution of sodium chloride in at least one diaphragm cell to form a caustic brine,
   2. carbonating and then further treating the caustic brine leaving the cell in a soda plant without ammonia by (a) treating the caustic brine in at least one monocarbonation scrubber by reacting the caustic brine with a gas having a low carbon dioxide content without causing bicarbonate precipitation in the monocarbonation scrubber to form a monocarbonated caustic brine, and (b) treating the monocarbonated caustic brine in at least one bicarbonation column by reacting at least part of it with gas rich in carbon dioxide to precipitate sodium bicarbonate in the bicarbonation column and to form a mother liquor,
   3. separating the precipitated sodium bicarbonate from the mother liquor by filtration,
   4. de-bicarbonating the separated mother liquor by converting the dissolved bicarbonate to carbonate,
   5. saturating the de-bicarbonated mother liquor with respect to sodium chloride, and
   6. treating the saturated liquor in an ammonia-soda process for making sodium carbonate and using the saturated liquor as at least a partial source of sodium chloride for such process.

2. A method as defined in claim 1 wherein in the ammonia-soda process of step (6) filtration is performed, apparatus is provided for absorption of ammonia and carbon dioxide, and a washing column is provided, a part of the liquor from filtration is recycled to the apparatus used for absorption of the ammonia and carbon dioxide recovered in the cycle of the said soda plant, so as to avoid precipitation in the absorber, the washing column and the upper part of the bicarbonation columns.

3. A method as defined in claim 2 wherein prior to recycling a part of the liquor from filtration in the ammonia-soda process of step (6) its carbon dioxide content is reduced.

4. A method as defined in claim 1 further comprising calcining the separated sodium bicarbonate of step (3) to form sodium carbonate.

5. A method as defined in claim 1 wherein the de-bicarbonated mother liquor is carried to saturation by evaporation.

6. A method as defined in claim 1 wherein the de-bicarbonated mother liquor is carried to saturation by adding solid salt.

7. A method as defined in claim 1 wherein the saturated liquor is the only source of sodium chloride for the ammonia-soda process of step (6).

8. A method as defined in claim 1 further comprising introducing purified brine of the type normally used in a conventional ammonia-soda plant as another source of sodium chloride for the ammonia-soda process of step (6).

9. A method as defined in claim 1 further comprising introducing, as another source of sodium chloride for the ammonia-soda process of step (6), a portion of the monocarbonated caustic brine.

10. A method as defined in claim 1 further comprising introducing, as another source of sodium chloride for the ammonia-soda process of step (6), a mixture of (a) purified brine of the type normally used in a conventional ammonia-soda plant, and (b) a portion of the monocarbonated caustic brine.

11. A method as defined in claim 1 further comprising evaporating at least a part of the caustic brine from the diaphragm cell to crystallize sodium chloride and form a brine more concentrated in caustic soda,
   separating the mother liquor from the crystals of sodium chloride thereby produced, and
   feeding this mother liquor into the soda plant without ammonia mixed with any remaing caustic brine that has not been evaporated.

12. A method as defined in claim 1 wherein part of the mother liquor from filtration means of the soda plant without ammonia, is recycled to enter the soda plant without ammonia between evaporators for crystallization of sodium chloride and the monocarbonation scrubber, to avoid crystallization in said scrubber.

13. A method as defined in claim 1 wherein the monocarbonated caustic brine leaving the monocarbonation scrubber contains sodium in the form of an alkaline sodium compound and further comprising removing part of said sodium present in the monocarbonated caustic brine leaving the monocarbonation scrubber in the form of sodium carbonate monohydrate crystals by passing the monocarbonated caustic brine through an evaporator-crystallizer installation before it enters the bicarbonation column of the soda plant without ammonia.

14. A method as defined in claim 1 wherein the di-bicarbonation of step (4) is brought about by heating and evolution of carbon dioxide.

15. A method as defined in claim 1 wherein the ratio of chlorine to the total sodium carbonate manufactured is increased by feeding to the ammonia-soda process of step (6) only part of the saturated, de-bicarbonated mother liquor resulting from step (5), the other part being used for the manufacture of sodium carbonate by carbonation in at least one supplementary bicarbonation column without ammonia.

16. A method as defined in claim 1 wherein the lower portion of the bicarbonation column is refrigerated.

17. A method as defined in claim 11 wherein another source of sodium chloride is provided for the ammonia-soda process of step (6) and this another source is a portion of the monocarbonated caustic brine.

18. A method as defined in claim 11 wherein another source of sodium chloride is provided for the ammonia-soda process of step (6) and this another source does not contain purified brine of the type normally used in a conventional ammonia-soda process.

19. A method as defined in claim 12 wherein the part of the mother liquor from the filtration means of the soda plant without ammonia that is recycled to enter the soda plant without ammonia is recycled after it has been de-bicarbonated.

20. A method as defined in claim 13 wherein said crystals are converted to heavy ash.

* * * * *